(12) United States Patent
Keller et al.

(10) Patent No.: US 9,946,259 B2
(45) Date of Patent: Apr. 17, 2018

(54) NEGATIVE OBSTACLE DETECTOR

(71) Applicant: RAYTHEON COMPANY, Waltham, MA (US)

(72) Inventors: Sean D. Keller, Tucson, AZ (US);
Gerald P. Uyeno, Tucson, AZ (US);
John R. Becker, Oro Valley, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 112 days.

(21) Appl. No.: 14/974,024

(22) Filed: Dec. 18, 2015

(65) Prior Publication Data
US 2017/0176990 A1    Jun. 22, 2017

(51) Int. Cl.
| G05D 1/00 | (2006.01) |
| G01S 17/42 | (2006.01) |
| G01S 17/93 | (2006.01) |
| G01S 7/48 | (2006.01) |
| G01S 7/481 | (2006.01) |

(52) U.S. Cl.
CPC .......... *G05D 1/0088* (2013.01); *G01S 7/4802* (2013.01); *G01S 17/42* (2013.01); *G01S 17/936* (2013.01); *G01S 7/4817* (2013.01)

(58) Field of Classification Search
None
See application file for complete search history.

(56) References Cited

U.S. PATENT DOCUMENTS

| 4,653,905 A | 3/1987 | Farrar et al. |
| 4,810,088 A | 3/1989 | Kaming et al. |
| 5,005,979 A | 4/1991 | Sontag et al. |
| 6,151,539 A * | 11/2000 | Bergholz .............. G01S 17/936 701/25 |
| 6,163,372 A | 12/2000 | Sallee et al. |
| 6,522,396 B1 | 2/2003 | Halmos |
| 6,526,352 B1 * | 2/2003 | Breed .................. G05D 1/0246 701/470 |
| 6,943,873 B2 | 9/2005 | Sallee |
| 7,376,314 B2 | 5/2008 | Reininger |

(Continued)

FOREIGN PATENT DOCUMENTS

| DE | 10155488 A1 | 5/2003 |
| WO | 2012/034881 A1 | 3/2012 |
| WO | 2014/200581 A2 | 12/2014 |

OTHER PUBLICATIONS

"Seeor: Evanescently Coupled Non-mechanical Beam Steering", Vescent Photonics, 2015 [retrieved on Sep. 2, 2016 ], <URL: http://www.vescent.com/wp-content/uploads/2015/04/LS-1uJ7.1.pdf>.

(Continued)

*Primary Examiner* — John Olszewski
*Assistant Examiner* — David P. Merlino
(74) *Attorney, Agent, or Firm* — Lando & Anastasi, LLP

(57) ABSTRACT

An obstacle detector configured to identify negative obstacles in a vehicle's path responsive to steering a laser beam to scan high priority areas in the vehicle's path is provided. The high priority areas can be identified dynamically in response to the terrain, speed, and/or acceleration of the vehicle. In some examples, the high priority areas are identified based on a projected position of the vehicles tires. A scan path for the laser, scan rate, and/or a scan location can be dynamically generated to cover the high priority areas.

19 Claims, 10 Drawing Sheets

(56) References Cited

U.S. PATENT DOCUMENTS

| | | | |
|---|---|---|---|
| 7,575,190 B2 | 8/2009 | Sallee | |
| 7,583,364 B1 | 9/2009 | Mayor et al. | |
| 7,626,152 B2 | 12/2009 | King et al. | |
| 7,745,771 B2 | 6/2010 | Troxell et al. | |
| 7,760,334 B1 | 7/2010 | Evans | |
| 8,237,835 B1 | 8/2012 | Muller | |
| 8,294,879 B2 | 10/2012 | Silny et al. | |
| 8,306,672 B2* | 11/2012 | Nickolaou | G01S 17/936 701/1 |
| 8,332,134 B2* | 12/2012 | Zhang | G06K 9/00805 701/23 |
| 8,364,334 B2* | 1/2013 | Au | G05D 1/024 701/23 |
| 8,380,025 B2* | 2/2013 | Anderson | G02F 1/295 349/21 |
| 8,400,619 B1 | 3/2013 | Bachrach et al. | |
| 8,463,080 B1 | 6/2013 | Anderson et al. | |
| 8,817,271 B1 | 8/2014 | Geary | |
| 8,970,740 B2 | 3/2015 | Herman et al. | |
| 8,982,313 B2 | 3/2015 | Escuti et al. | |
| 8,989,523 B2 | 3/2015 | Anderson et al. | |
| 9,254,846 B2* | 2/2016 | Dolgov | G05D 1/0088 |
| 9,383,753 B1* | 7/2016 | Templeton | G05D 1/0246 |
| 9,477,135 B1 | 10/2016 | Uyeno et al. | |
| 9,530,055 B2* | 12/2016 | Goodwin | G01S 17/89 |
| 2005/0060092 A1 | 3/2005 | Hablani | |
| 2007/0034732 A1 | 2/2007 | Sallee | |
| 2007/0219720 A1* | 9/2007 | Trepagnier | G05D 1/024 701/300 |
| 2008/0088424 A1* | 4/2008 | Imura | G01S 17/936 340/436 |
| 2009/0015658 A1 | 1/2009 | Enstad et al. | |
| 2009/0097038 A1* | 4/2009 | Higgins-Luthman | B60G 17/019 356/602 |
| 2009/0142066 A1 | 6/2009 | Leclair et al. | |
| 2010/0030473 A1 | 2/2010 | Au et al. | |
| 2010/0128221 A1 | 5/2010 | Muller et al. | |
| 2013/0021474 A1 | 1/2013 | Taylor et al. | |
| 2013/0100538 A1 | 4/2013 | Kim | |
| 2015/0202939 A1* | 7/2015 | Stettner | G01S 17/936 701/37 |
| 2015/0285625 A1 | 10/2015 | Deane | |
| 2015/0293228 A1* | 10/2015 | Retterath | G01S 17/42 356/5.01 |
| 2015/0362921 A1* | 12/2015 | Hanaoka | G05D 1/024 701/23 |
| 2015/0378187 A1 | 12/2015 | Heck et al. | |
| 2015/0378242 A1 | 12/2015 | Auxier et al. | |
| 2016/0006914 A1 | 1/2016 | Neumann | |

OTHER PUBLICATIONS

Ayral et al., "Phase-Conjugate Nd:YAG Laser with Internal Acousto-Optic Beam Steering", Optics Letters, vol. 16, No. 16, Aug. 15, 1991, pp. 1225-1227.

Buck et al., "Polarization Gratings for Non-mechanical Beam Steering Applications", Proc. SPIE, vol. 8395, Acquisition, Tracking, Pointing, and Laser Systems Technologies XXVI, 83950F, May 15, 2012.

Chiu et al., "Shape-Optimized Electrooptic Beam Scanners: Analysis, Design, and Simulation", IEEE, Journal of Light Wave Technology, vol. 17, No. 1, Jan. 1999, pp. 108-114.

Geary et al., "Dragonfly Directional Sensor", SPIE, Optical Engineering, vol. 52, Feb. 2013, 9 Pages.

International Search Report and Written Opinion for application No. PCT/US2016/057341 dated Aug. 14, 2017.

Keller et al., "Emerging Liquid Crystal Waveguide Technology for Low SWaP Active Short Wave Infrared Imagers", Proceedings of SPIE, vol. 9384, Jan. 2015.

Kim et al., "Wide-Angle, Nonmechanical Beam Steering Using Thin Liquid Crystal Polarization Gratings", Proc. of SPIE, vol. 7093, 2008.

Partial International Search Report for application No. PCT/US2016/057341 dated Jun. 14, 2017.

* cited by examiner

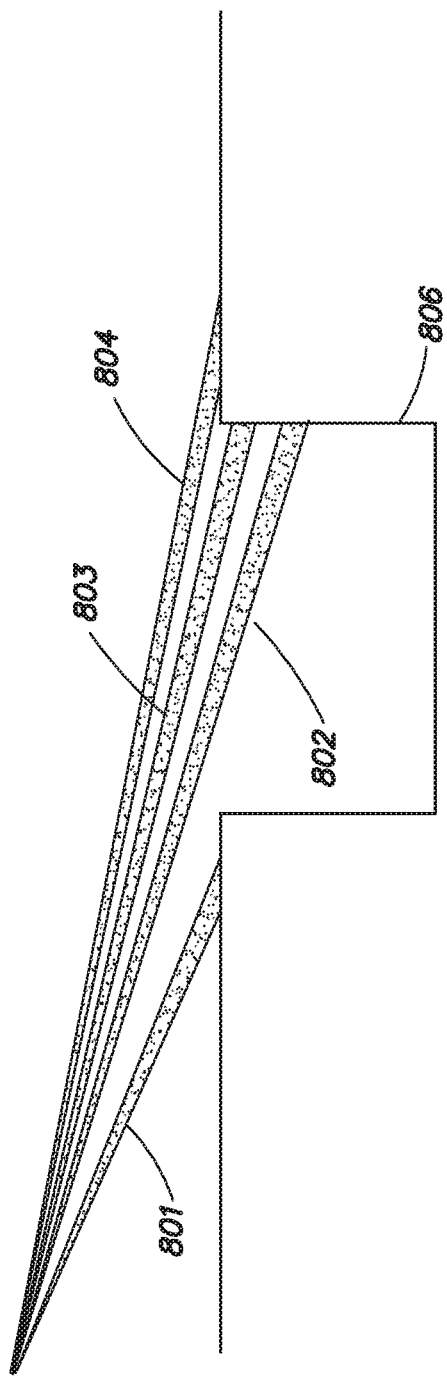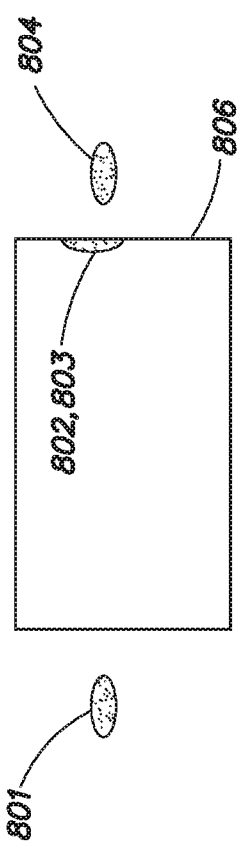
FIG. 8A
FIG. 8B

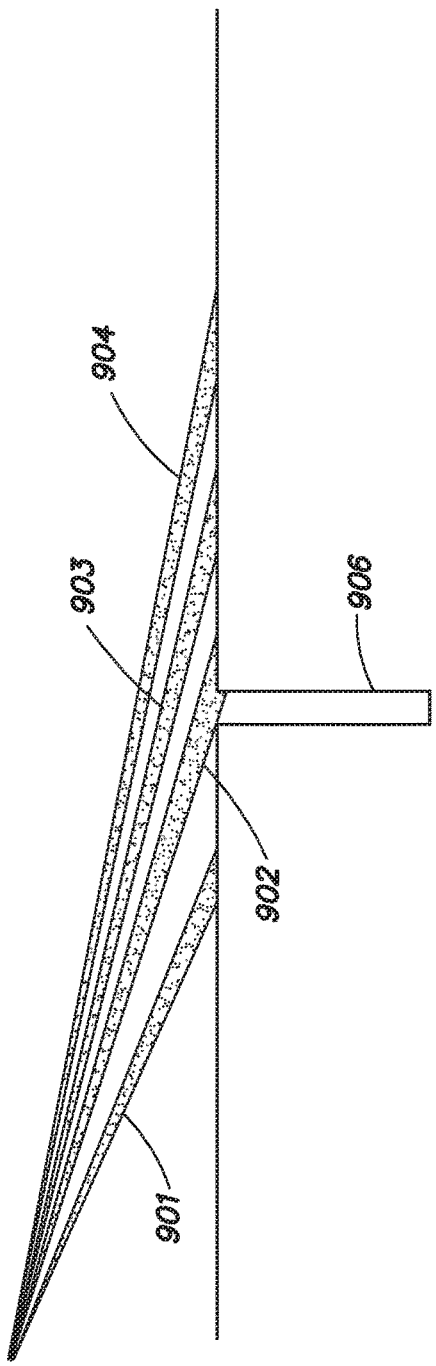
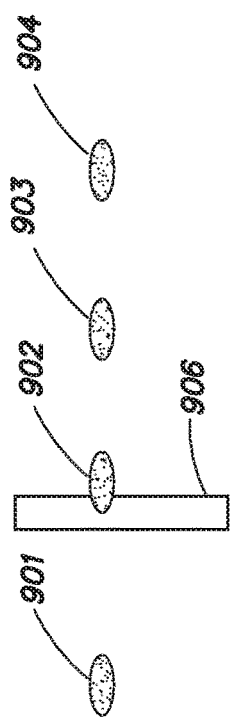
FIG. 9A
FIG. 9B

NEGATIVE OBSTACLE DETECTOR

BACKGROUND

Unmanned ground vehicles (UGVs) include remote-driven or self-driven land vehicles that can carry cameras, sensors, communications equipment, or other payloads. Self-driven or "autonomous" UGVs are essentially robotic platforms that are capable of operating outdoors and over a wide variety of terrain with little or no operator input. To perform optimally, autonomous vehicles should be capable of detecting obstacles in different types of terrain to identify traversable paths. Conventional implementations of autonomous vehicles can include laser detection and ranging (LADAR) sensors that are used to measure the range to each point within a scan area that sweeps across a horizontal line. Other conventional implementations either flood illuminate an entire scene with a single pulse or scan a laser line using rotating mirrors or similar rotating structure. Further, onboard global positioning system (GPS) and inertial navigation system (INS) sensors can provide geo-location information and information that indicates vehicle dynamics (e.g., position and altitude of the vehicle, as well as the velocity and angular velocity of the vehicle). Together, these systems can map traversable paths for the autonomous vehicle.

In spite of advances in LADAR, GPS, and INS, difficulties persist in object detection and avoidance. One conventional approach is detailed in U.S. Patent Application Publication 2010/0030473 to Au, which describes augmentation of autonomous guidance systems to implement scanning and stored range scans in variable sized buffers and is incorporated herein by reference in its entirety. As described, the scan information can be translated into an estimated ground plane using information from the GPS and INS systems. The estimated ground plane is used to classify traversable areas, non-traversable areas, and obstacle areas for navigation.

SUMMARY OF INVENTION

Aspects and embodiments described herein are directed to an obstacle detector that incorporates methods and apparatuses for identifying positive and negative obstacles in the path of an autonomous vehicle. Negative obstacles are characterized by absences including, but not limited to, voids, holes, and/or depressions in a vehicle's path of travel. Detecting an absence in a pathway (e.g., a hole) has proven quite difficult. Conventional implementations can fail to detect such negative obstacles with sufficient accuracy for the vehicle to complete the traverse. Further, problems with conventional systems are exacerbated when the autonomous vehicle is operating at speed. Positive obstacles are much easier to identify using conventional systems, but this system has certain advantages for positive obstacles also.

Although, conventional LADAR systems can detect large negative obstacles by scanning a laser beam across a horizontal line, many cannot detect small negative obstacles. Commercially available scanners typical rely on rotating mirrors to scan a laser beam across an area in front of a UGV, which is referred to as a field of regard (FOR). In these examples, the system captures information about the entire FOR at a constant rate. These commercially available systems provide no option to decrease the area associated with the FOR or increase the data refresh rate to capture information faster as terrain or vehicle speed may require. Other scanning methods such as gimbaled lasers, or Risley prisms exist.

According to one embodiment, a negative object detector scans a laser beam over the FOR to detect negative obstacles. The negative object detector includes a small laser beam that samples for negative obstacles multiple times at specified locations within the FOR. In one embodiment, the laser beam is targeted across specific areas in the FOR and at specific locations using a laser scanner device. In one example, the laser scanner device can include a high-speed, solid-state liquid crystal waveguide (LCWG) beam scanner.

In another embodiment, the LCWG targets the laser beam based on custom scanning patterns to maximize the detection of negative obstacles without compromising UGV speed or performance. For example, scanning patterns can be dynamically generated by a processing component responsive to current terrain and/or vehicle information (e.g., speed or direction), and in further examples, can also incorporate historic information on an area that the UGV will traverse. Manipulating the scan pattern enables negative object detection (as well as positive object detection) at higher data refresh rates and further enables the scan to be focused on high priority areas (e.g., in front of the vehicles wheels). According to one embodiment, focused scanning on high priority areas enables detection of small negative obstacles (e.g., one meter across) at ranges of forty meters or greater and at sensor heights of only 2 m off the ground. Conventional horizontal scan LADAR systems cannot detect negative obstacles with such precision because, for example, they cannot adapt the scan region within the FOR, and scene or image based object detection is equally unsuited, as shadows can be incorrectly identified as negative obstacles. Further, scene or image based object detection can be compromised in low visibility and/or night conditions. Finally flash based LADAR systems are large and the required laser power to scan the scene prohibits implementation on small platforms.

According to one embodiment, the method further comprises acts of dynamically adjusting a base scan pattern to emphasize priority areas in a field of regard, and identifying by the at least one processor the priority areas responsive to determining an estimated position for one or more portions of the autonomous vehicle that contact ground. According to one embodiment, the method further comprises an act of increasing a scan range associated with the scan pattern responsive to an increase in speed of the autonomous vehicle. According to another embodiment, the method further comprises an act of decreasing a scan range associated with the scan pattern responsive to a decrease in speed of the autonomous vehicle. According to one embodiment, the method further comprises an act of increasing a scan refresh rate associated with the scan pattern responsive to an increase in speed of the autonomous vehicle. According to one embodiment, the method further comprises an act of decreasing a scan refresh rate associated with the scan pattern responsive to a decrease in speed of the autonomous vehicle.

According to one aspect, an obstacle detector is provided. The obstacle detector comprises a laser scanner device, which includes: an optical source configured to emit a laser beam, a steering device configured to steer the laser beam from the optical source along a trajectory according to a discrete scan pattern, and a range detector for generating range information based on reflection of the laser beam, and at least one processor operatively connected to the steering device configured to: define the discrete scan pattern, wherein the scan pattern includes a path for the laser beam, steer the steering device to direct the laser beam according to the scan pattern, and identify at least one negative obstacle using range data captured by the laser scanner device.

According to one embodiment, the steering device comprises a solid-state liquid crystal waveguide (LCWG). According to one embodiment, the at least one processor is further configured to identify an indicator of a negative obstacle responsive to detecting a split return or responsive to intensity information captured by the laser scanner device. According to one embodiment, the at least one processor is configured to validate the indicator of the negative obstacle responsive to subsequent scanning of a region of the indicator. According to one embodiment, the at least one processor is configured to evaluate energy return from a candidate obstacle to validate the indicator of the negative obstacle. According to one embodiment, the optical source is configured to emit multiple wavelengths, and wherein the at least one processor is further configured to identify negative obstacles responsive to correlating returns from multiple wavelengths.

According to one embodiment, the at least one processor is configured to define the scan pattern responsive to analyzing terrain information, vehicle information, information from the INS, information from the GPS, and an estimated a travel path for the autonomous vehicle. According to one embodiment, the at least one processor is configured to: estimate a position for one or more portions of the autonomous vehicle that contact the terrain based on the estimated travel path, and define the scan pattern to cover at least the estimated position for the one or more portions of the autonomous vehicle that contacts the terrain. According to one embodiment, the at least one processor is configured to generate control signals to manage steering of steering device according to the scan pattern.

According to one embodiment, the at least processor is configured to define the scan pattern and a scan frequency for high-speed rescanning of candidate obstacles; and wherein at least one processor is configured to tailor the definition of the scan pattern responsive to vehicle speed. According to one embodiment, the at least one processor is further configured to tailor a range gate associated with the range detector; wherein the at least one processor triggers: a large range gate for capturing general characteristics of a scan surface, a small range gate and bit depth increase for detecting perturbations in the scan surface, and a large range gate to plot slopes of the scan surface or detect large differences heights of the scan surface.

According to one embodiment, the at least one processor is configured to reduce a scan area associated with the scan pattern responsive to an increase in speed or a decrease in speed of the autonomous vehicle. According to one embodiment, the at least one processor is configured to dynamically adjust a base scan pattern to emphasize priority areas in a field of regard, wherein the priority areas are identified by the at least one processor responsive to determining an estimated position for one or more portions of the autonomous vehicle that contact ground. According to one embodiment, the at least one processor is configured to analyze return signals to: identify intensity differences to determine a location of the laser beam on a path, identify range differences to determine the location of an obstacle edge, correlate size change of a negative obstacle relative to sample time, identify regions free of negative obstacles responsive to scan information, including a scan area for a single wheel and scan information captured on another discrete area based on a distance offset associated with a second wheel, identify positive obstacles larger than ground clearance associated with the vehicle.

According to another aspect a method of detecting a negative obstacle is provided. The method comprises emitting, by an optical source, a laser beam, directing, by a steering device, the laser beam along a trajectory according to a discrete scan pattern, defining, by at least one processor, the scan pattern, wherein the scan pattern includes a path for the laser beam, triggering, by the at least one processor, the steering device to direct the laser beam according to the scan pattern, and identifying, by the at least one processor, at least one negative obstacle responsive to range data from a range finder.

According to one embodiment, the act of identifying the at least one negative obstacle includes identifying an indicator of a negative obstacle responsive to detecting a split return or responsive to intensity information captured by the laser scanner device. According to one embodiment, the act of identifying includes acts of: analyzing multiple wavelengths, and identifying negative obstacles responsive to correlating returns from the multiple wavelengths. According to one embodiment, the optical source is configured to emit multiple wavelengths, and wherein the act of identifying includes identifying negative obstacles responsive to correlating returns from multiple wavelengths. According to one embodiment, the method further comprises validating the indicator of the negative obstacle responsive to subsequent scanning of a region of the indicator. According to one embodiment, validating the indicator of the negative obstacle includes an act of evaluating an energy return from a candidate obstacle to validate the indicator of the negative obstacle.

According to one embodiment, the act of defining the scan pattern includes defining the scan pattern responsive to analyzing one or more of: terrain information, vehicle information, or an estimated travel path for the autonomous vehicle. According to one embodiment, the act of estimating the travel path for the autonomous vehicle includes an act of estimating a position for one or more portions of the autonomous vehicle that contact the terrain based on the estimated travel path and wherein the act of defining the scan pattern includes defining the scan pattern to cover at least the estimated position for the one or more portions of the autonomous vehicle that contacts the terrain. According to one embodiment, the steering device comprises a solid-state liquid crystal steering device and wherein the act of triggering the steering device to direct the laser beam according to the scan pattern includes generating, by the at least one processor, control signals to manage steering of the laser beam by the steering device. According to one embodiment, defining the scan pattern includes defining a location and a scan frequency for high-speed rescanning of candidate obstacles, and tailoring the definition of the scan pattern responsive to vehicle speed.

According to one embodiment, the method further comprises an act of tailoring a range gate associated with the range detector; wherein tailoring the range gate includes: establishing a large range gate for capturing general characteristics of a scan surface, establishing a small range gate and bit depth increase for detecting perturbations in the scan surface, and establishing a large range gate to plot slopes of the scan surface or detect large differences in relative height of sections of the scan surface. According to one embodiment, the method further comprise at act of analyzing return signals and at least one of: identifying intensity differences to determine a location of the laser beam on a path responsive to analyzing the return signals, identifying range differences to determine the location of an obstacle edge responsive to analyzing the return signals, correlating size change of a negative obstacle relative to sample time responsive to analyzing the return signals, identifying regions free of negative obstacles responsive to scan information, including a scan area for a single wheel and scan information captured on another discrete area based on a distance offset associated with a second wheel, responsive to analyzing the return signal, or identifying positive obstacles larger than ground clearance associated with the vehicle, responsive to analyzing the return signals.

According to some embodiments, the obstacle detector is configured to revisit the potential negative obstacle to determine reality (e.g., validate a candidate obstacle is an actual obstacle and not an aberration or error). In one embodiment, the detector includes multiple wavelength emitters, and is further configured to evaluate an energy return correlation to detect a negative obstacle (e.g., ratio of energy change should match ratio of hole subtense change). In one embodiment, the detector is configured to trigger high-speed revisitation of an obstacle for correlation based on vehicle speed. In another embodiment, a range gate for a laser range finder can be set to finely sample a target with high precision and shift the range gate across a wide number of ranges to sample the entire area with high precision. This method enables identification of surface slopes in support of identifying negative obstacles. In one example, a large range gate can be implemented to plot overall slopes and determine fall-offs of the leading edge of the obstacle (e.g., cliffs). In other examples, a small range gate can be implemented and the surface slopes of the obstacle can be measured. The change in range gate is triggered by a possible object identified during the large range gate setting. In another example, the small range gate is shifted across all ranges to measure to scan for positive obstacles. This method may increase the scan time, so omitting some points within the smaller range gate is possible to maintain the same scan rate as the first example.

According to another embodiment, the detector is configured to evaluate intensity differences to determine a location of a laser beam on a travel path. Responsive to detecting a range difference in returned signal, the detector can determine the location of an obstacle edge. In further embodiments, the detector is configured to correlate size or characteristics of an obstacle with small differences in sampling time and returned information. In other embodiments, the detector is configured to identify regions free of negative obstacles based on scans for a single wheel or locomotive element, and then scans for a distance offset for the second wheel or locomotive element. This approach targets two discrete areas minimizing the total scan area needed for multiple contact areas. In one embodiment, the detector is also configured to scan for positive obstacles larger than a vehicle's ground clearance. In some examples, scans for positive objects can be limited to use for routing around objects.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 8A and 8B are side and top views, respectively, of a block diagram of an obstacle detector and beam geometry, according to aspects of the invention;

FIGS. 9A and 9B are side and top views, respectively, of a block diagram of an obstacle detector and beam geometry, according to aspects of the invention.

DETAILED DESCRIPTION

Figure 1:
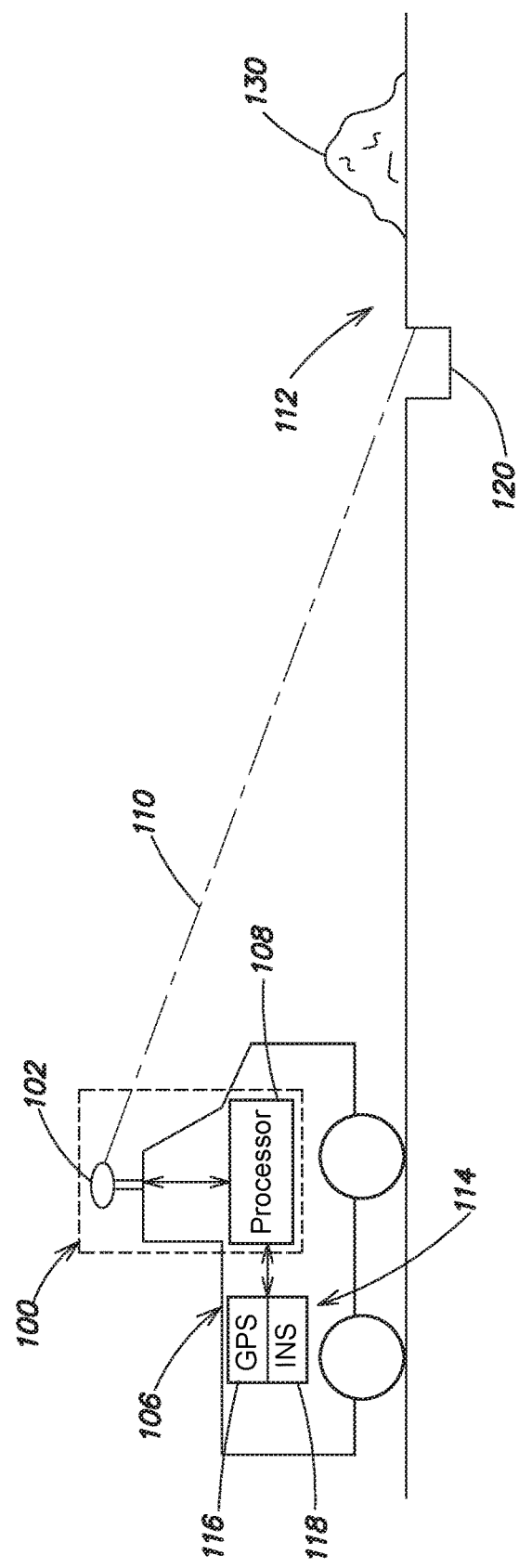
FIG. 1 is a block diagram of an obstacle detector installed on an autonomous vehicle according to aspects of the invention.

Aspects and embodiments are directed to a detector that may be mounted on a vehicle to enable autonomous operation of the vehicle. In some examples, the detector can be mounted on manned vehicles and provide assistance (e.g., collision avoidance, object avoidance, etc.) to human drivers. Autonomous vehicle as used herein is intended to include completely autonomous vehicles as well as vehicles with human operators, where driving operation can be assisted or taken over by computer systems.

As discussed in more detail below, embodiments of the detector include a laser scanner device, such as a laser range finder, which may include or be based on a solid-state liquid crystal waveguide, that steers a laser beam from the range finder transmitter to target high priority areas in front of the autonomous vehicle and a detector that provides range to the area illuminated by the laser beam. Discontinuities in the range information can be used to identify obstacles which allow the autonomous vehicle to avoid any holes at high speed that create navigational barriers. In one example, discontinuity is established by range and intensity information indicative of a hole or other negative obstacle, where multiple returns show the same range and intensity at different angles, which can be indicative of a wall of a hole (see e.g., Table I).

In some embodiments, the laser scanner device can be coupled with global positioning systems, and inertial navigation systems to allow a processing component to analyze terrain and create traversable pathways for the autonomous vehicle to follow. In the absence of GPS or INS data, a video camera and processor for tracking objects within the camera field of view can be used. The processing component can also be configured to dynamically generate a scan pattern and/or scan locations based on current terrain, historic information, and/or vehicle information. The scan pattern and/or location can be generated to specifically target areas in front of the wheels of the autonomous vehicle or areas where the wheels will be based on inputs from the UGV navigation system. Further examples use historical terrain information to facilitate identification of obstacles, including voids, and can also be used to dynamically determine the scan pattern or scan locations. In further examples, user preferences can also be specified and used in generating scan patterns and/or identifying scan locations by the processing component.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIG. 1, there is illustrated a block diagram of one example of an object detector installed on an autonomous vehicle according to certain aspects. The object detector 100 includes a laser scanner device 102. The laser scanner device includes a laser (e.g., diode or similar emitter), a liquid crystal waveguide to steer the laser beam across a field of regard ("FOR"), and a range finding detector capable of determining the range to the target shown. For example, the laser scanner device 102 steers a laser beam 110 to targeted areas in a potential travel path 112 of the autonomous vehicle 106. In some embodiments, the laser scanner device 102 is connected or includes a processing component 108, having at least one processor. The processing component is configured to process range data received from the laser scanner device 102 and identify obstacles (e.g., hole 120 or obstacle 130) in proximity to the autonomous vehicle.

In one particular example, the processing component 108 is configured to identify discontinuity in range data from the laser scanner device 102 to detect negative obstacles. In one example, discontinuity is established by range and intensity information indicative of a hole or other negative obstacles, where multiple returns show the same range and intensity at different angles. In further embodiments, the processing component 108 is configured to tailor object detection based on the properties of an object in the vehicle path. For example, discussed in greater detail below are processes for object detection where beam divergence is less than the angle subtended by the object and where beam divergence is not less than the angle subtended by the hole (see e.g., FIGS. 8A-B and 9A-B).

Returning to FIG. 1, shown is a single laser scanner device 102 implemented on the autonomous vehicle 106. In other embodiments, it is appreciated that multiple laser scanners can be implemented. In some embodiments, multiple scanning devices can facilitate detection and estimation of obstacle size. In some embodiments, the scanning device can also be positioned differently on the autonomous vehicle 106. In yet other examples, laser scanner device may include range finder that can be separated into a laser emitter with laser waveguide and a separate laser detector, and the present disclosure includes different configurations than the example illustrated in FIG. 1.

The laser scanner device 102 may include a laser source (e.g., a laser diode or other optical source), a laser steering device such as a liquid crystal waveguide, optics (e.g., lens, etc.) and processing electronics for controlling the laser source and steering device. In one example, the laser scanner device includes a laser range finder for capturing range data.

According to some embodiments, the processing component 108 can be connected to a navigation subsystem 114. The navigation subsystem 114 can be used to automatically control direction, velocity, and other operating characteristics of the autonomous vehicle. In some examples, the navigation subsystem 114 includes a GPS component 116 and an INS component 118 that provide geo-location data and operational information (e.g., speed, acceleration, etc.) on the vehicle. The geo-location data and operational information can be used to determine real world position and/or control operation (including direction of travel, speed, etc.) of the autonomous vehicle 106.

According to one embodiment, the processing component 108 is configured to analyze information on a planned travel path, for example, obtained from the navigation subsystem 114. The processing component 108 can determine high priority areas to scan responsive to analyzing the planned travel path and, for example, estimating the position of the vehicle's wheels along the travel path. In another embodiment, the processing component 108 can also determine high priority areas from receipt of information on possible obstacles based on camera systems that aid in UGV navigation. In other examples, the processing component 108 can estimate the position of a vehicle's motion surfaces (e.g., treads or other locomotive components, wheels, feet, etc.) along the planned travel path. According to another embodiment, the processing component 108 can be configured to tailor scan areas based on the locomotive components of the autonomous vehicle. For example, some autonomous vehicles can be capable of entering a detected obstacle. The processing component 108 can be configured to determine the depth of the obstacle (e.g., the hole) based on determined range information. The depth of the obstacle can be used by the processing component 108 to determine if the hole can be entered, travelled over, or if the vehicle must go around.

In one example, the processing component 108 dynamically generates a scan pattern and/or a scan location to target the high priority areas in the planned travel path. In further examples, the processing component continuously identifies high priority areas in a FOR responsive to data from the navigation subsystem 114 and/or the laser scanner device 102, responsive to identifying obstacles and/or responsive to changes from any planned or estimated travel path. In some embodiments, the processing component 108 includes information on historic routes and any obstacle information recorded along those routes. The processing component 108 can incorporate historic information during determination of high priority areas. For example, the processing component 108 can target (e.g., identify as high priority) previously identified obstacles for scanning. According to another example, user preferences may also be used to target scan areas or scan locations for the negative object detector. For example, the processing component 108 can be configured to analyze any user preferences in defining the high priority areas to scan. For example the user may specify certain preferences including any one or more, or any combination of the following: vehicle characteristics (e.g., tire position, size of vehicle, width of vehicle, etc.); minimum scan rates or scan ranges; scan pattern/location/area for a current speed or current speed range; terrain based preferences (e.g., known road and known conditions (e.g., paved instead of off-road); weather conditions; route preferences to select routes that: optimize travel time, optimize fuel savings, set a level of acceptable mission risk, and weigh the inputs from different sources differently based on accuracy of past data or quality of current data, among other options.

Figure 2:
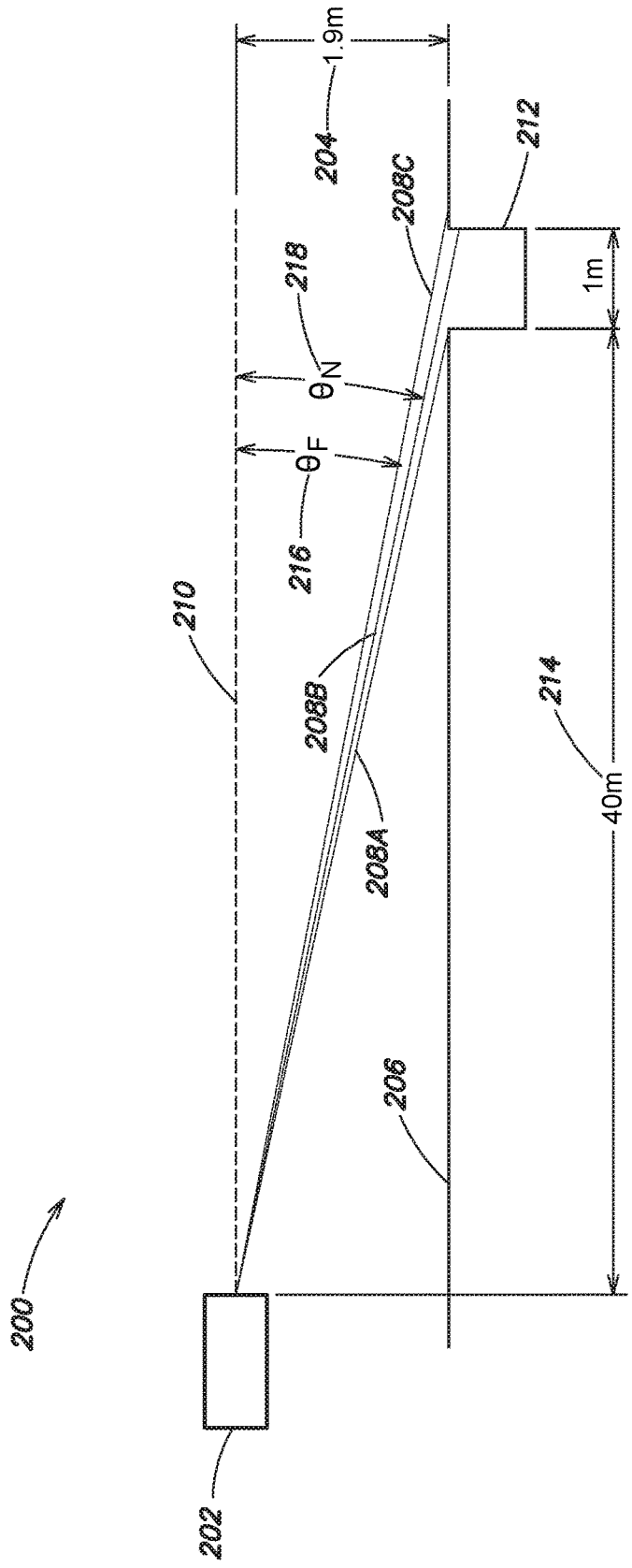
FIG. 2 is a block diagram of an obstacle detector geometry according to aspects of the invention.

FIG. 2 illustrates an example implementation of a negative object detector 200 and an example detection case. Other embodiments include adjustable range finding distances, scan intervals, etc., all of which may be tailored to any mission parameters. In FIG. 2, the negative object detector is in a fixed position to illustrate capability to detect small negative obstacles at distance. A laser scanner device 202 is positioned 1.9 meters (at 204) above a travel surface 206. In one example, the laser scanner device includes a laser range finder. An emitted laser beam is illustrated having different angles as measured from a projected horizon line 210 drawn parallel to the travel surface. For a negative obstacle of one meter in length 212 (an example case) that is forty meters from the laser range finder 202 (an example case), the first beam 208A establishes a range to the travel surface, the second beam 208B shows a range into the negative obstacle at angle theta-sub-n 218, and the third beam 208C shows a range to the travel surface beyond the negative obstacle 212 at angle theta-sub-f. The difference between theta-sub-n and theta-sub-f was calculated at seven one hundredths of a degree for this embodiment. In one example, lasers can be selected based on divergence properties where double the laser's divergence is less than a desired resolution (e.g., less than seven one hundredths of a degree). According to some embodiments, signal processing analysis is also implemented to determine the range where the divergence condition cannot be met. In further embodiments, the maximum range where the divergence condition can be met is set for the processing component 108. In other embodiments, the maximum range can be captured as a user preference.

Figure 3:
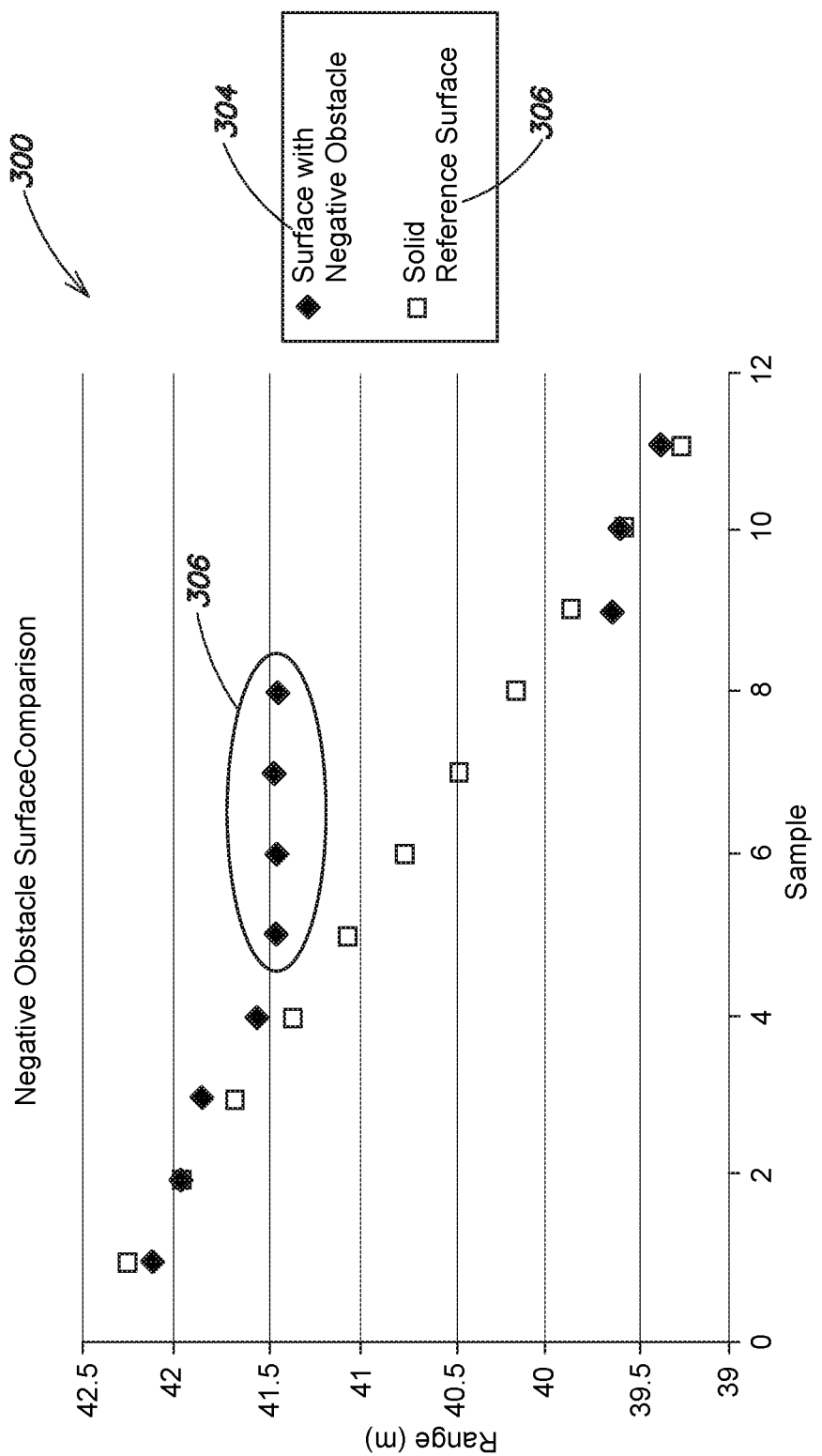
FIG. 3 is a graph of obstacle data obtained in accord with aspects of the invention.

FIG. 3 shows a plot 300 of range data captured for an even surface (302—depicted with squares) in conjunction with range data captured for a surface with a negative obstacle (304 depicted with diamonds). At 306, shown is a discontinuity in the surface having the negative obstacle. A processing component of an obstacle detector (e.g., 108 of FIG. 1) can be configured to detect discontinuity in a surface to identify the negative obstacle. In some examples, the processing component can generate a projection for an expected surface reading, and identify discontinuity based on deviation from the projection. In other examples, the processing component can also analyze historic scan information or topographical information on a surface to identify discontinuity in obtained scan information. In further examples, information on a surface may also be generated by the processing component using information from navigation systems, which may also include GPS and/or INS information, as well as historic information obtained on a given surface.

FIGS. 8A-B and 9A-B illustrate example object detection scenarios. FIGS. 8A and 8B illustrate where beam divergence is less than the angle subtended by the object (e.g., hole 806). For example, beam 801 returns information on a travel surface prior to detecting the object. Beams 802 and 803 return information on a detected object, and the multiple returns from within the object (e.g., the hole 806) match. The walls can be measured, and for example, a depth of the object can be determined (e.g., using continued scans as a vehicle approaches the obstacle). FIG. 8B shows the beams 801-804 and hole 806 from a top view.

Table I provides comparative information on beam, range, and an intensity return for FIGS. 8A and 8B, to further illustrate the differences in the object detection cases shown in FIGS. 8A-B and 9A-B. The single range and intensity return for 802 and 803 are the result of a wall of a negative obstacle.

TABLE I

| Beam | Range | Intensity |
|---|---|---|
| 801 | X | Y |
| 802 | X + 1.1 | Y |
| 803 | X + 1.1 | Y |
| 804 | X + 2 | Y |

FIGS. 9A and 9B illustrate where beam divergence is not less than the angle subtended by the object (e.g., hole 906) with a side and top view of the emitted beams. Beam 901 returns information on a travel surface prior to reaching the object. Beam 902 is split by the object so that there is not a distinct return that matches an object (e.g., hole 906). Beams 903 and 904 return information on the travel surface in an area past the object. As illustrated in Table II, the intensity of the split return is approximately equal to the intensities of un-split returns (e.g., beams 901, 903, and 904—see Table II. below). Additionally, the range of separation of the split returns is very small (i.e., between X+1.1 and C).

TABLE II

| Beam | Range | Intensity |
|---|---|---|
| 901 | X | Y |
| 902 | X + 1.1, C | A,B |
| 903 | X + 2 | Y |
| 904 | X + 3 | Y |

According to some embodiments, any detection of a split return can trigger a more intensive mode of operation for an object detector. For example, when operating in the intensive mode the object detector can use the entire bit depth to increase sensitivity in measuring distance, and may also task additional processing capability to accommodate required processing speeds (e.g., assign additional processors, pause or lock out current executing processes in favor of the intensive scanning mode, etc.). Additionally, new scan patterns, locations, and/or faster refresh rates can be triggered responsive to entering the intensive mode of operation.

Figure 4:
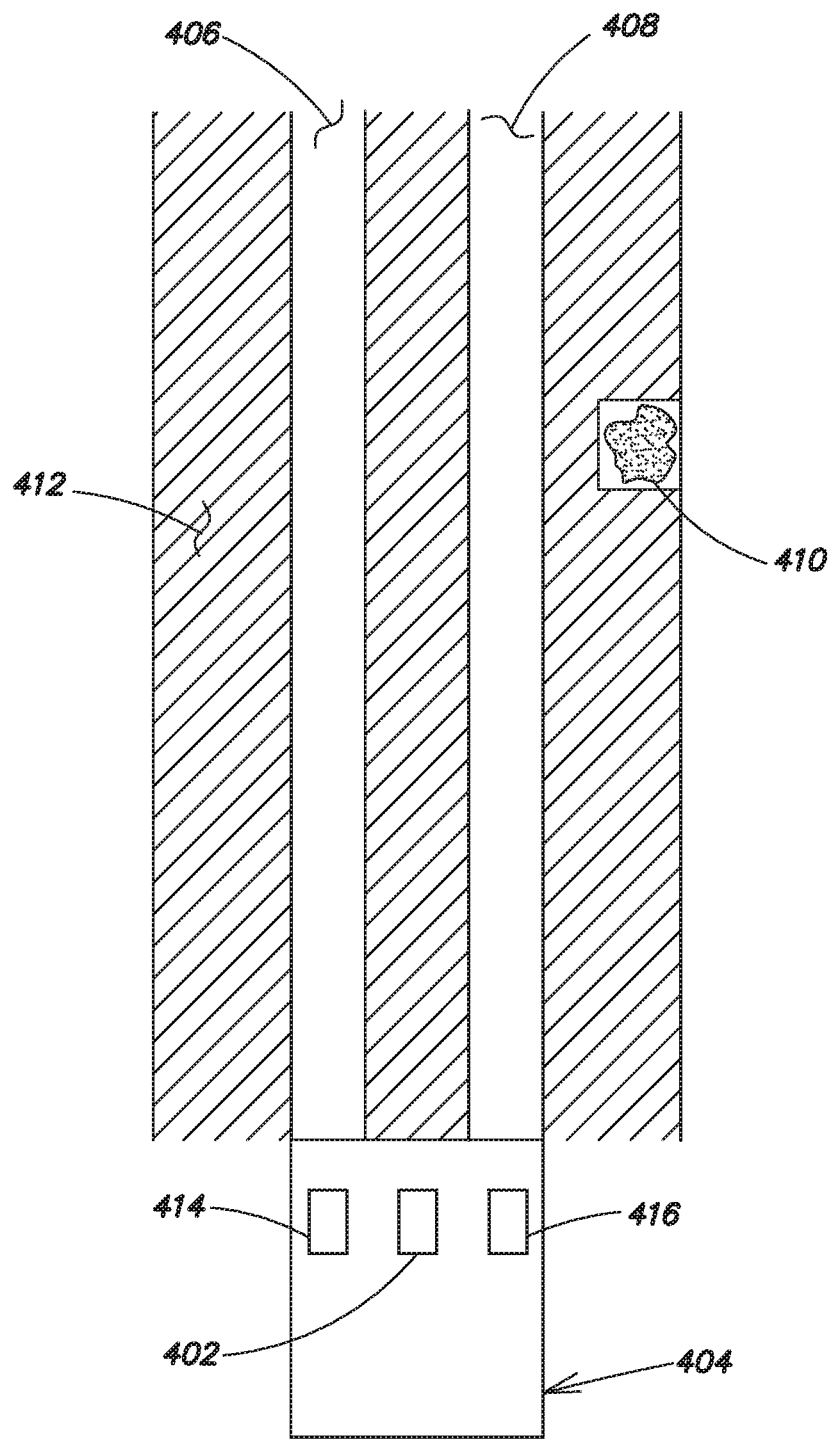
FIG. 4 is a comparison of hypothetical scan areas by an obstacle detector according to aspects of the invention.

FIG. 4 illustrates hypothetical scan areas for a negative object detector 402 on an autonomous vehicle 404. As discussed above, the obstacle detector can be configured to scan high priority areas, for example, in front of the vehicle's tires at 414 and 416 and the respective projected paths 406 and 408. Another example high priority area can include previously identified obstacles at 410. As illustrated in FIG. 4, conventional systems that scan an entire field of regard would scan the entire cross-hashed area 412 in addition to 406, 408, and 410. This system scans only 406 and 408 unless directed by the user of navigational system. As shown in FIG. 4, targeted scanning for obstacles improves efficiency in data capture.

According to some embodiments, laser scanners can be positioned on an autonomous vehicle 404 to facilitate capture of high priority scan areas. For example, negative object detectors and specifically steerable laser scanners can be positioned at 414 and 416 above the vehicle's tires or treads. Positioning the detectors above the wheels can simplify capture of information on high priority scan areas and/or simplify the determination of scan patterns that the detectors execute. This does reduce the standoff range of such a sensor because at distances closer to the traveling surface the negative obstacles subtend a much smaller angular range. In some embodiments, it may be advantageous to locate the sensors above the wheels on the top of the vehicle. In other embodiments, negative object detectors can be used in conjunction with conventional detectors. For example, negative object detectors can be placed at 414 and 416 on an autonomous vehicle to provide information on negative obstacles, and a conventional object detector can be placed at 402 to provide for conventional object detection functions. In other embodiments, different configurations and/or different placements are used to combine conventional detection functions and negative object detection possibly within the same device.

Figure 5:
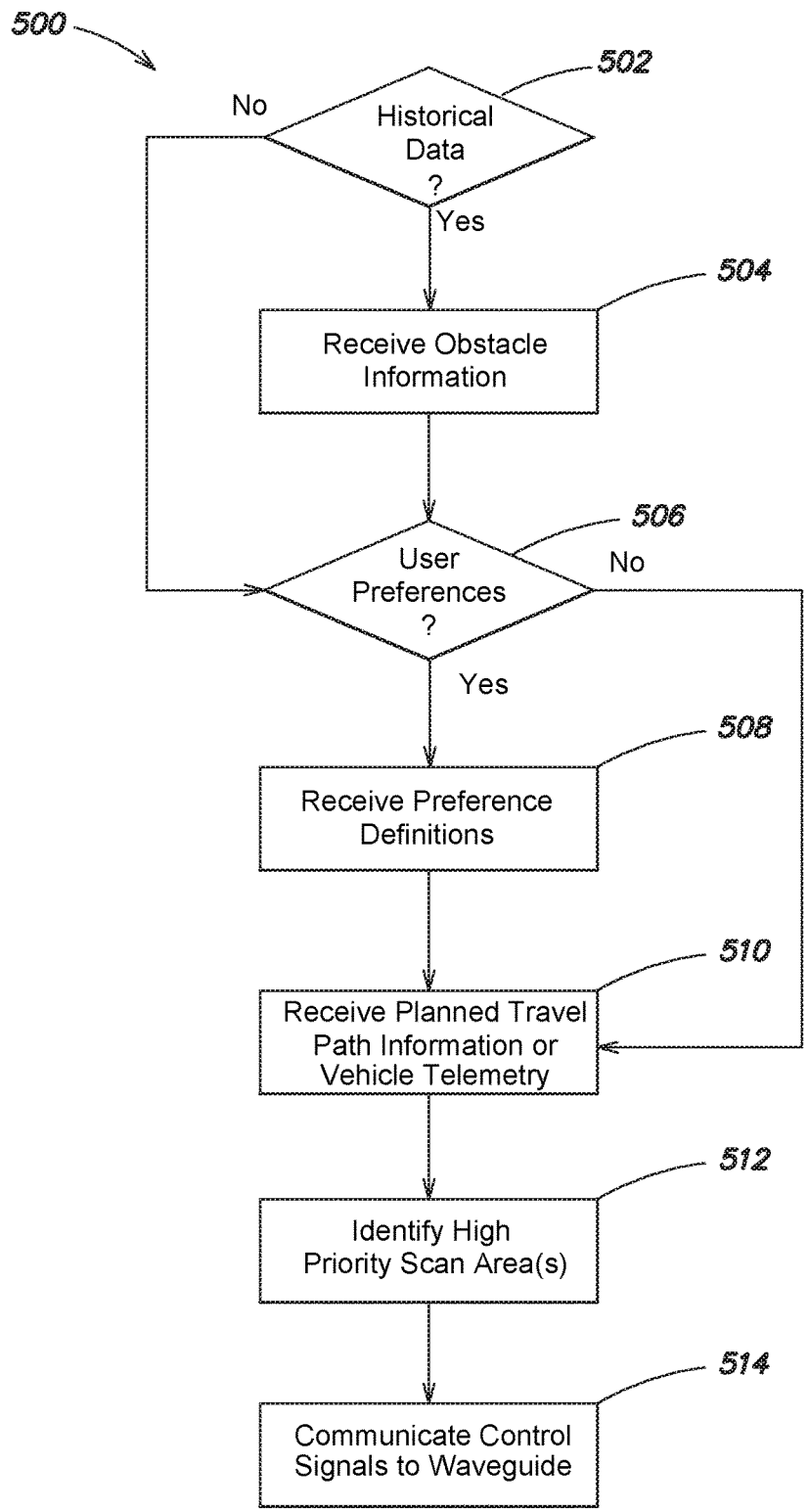
FIG. 5 is a process flow for controlling a scan pattern of a negative object detector according to aspects of the invention.

FIG. 5 is an example process flow 500 for controlling a scan pattern of a negative object detector. The process flow 500 begins at 502 where historical data for given terrain can be retrieved at 504, if the historical data is available, 502 YES. For example, previous scans of the terrain can be stored and made available for subsequent routes over the same terrain. Known obstacles and respective positions can also be stored for subsequent use. In some examples, positions of known obstacles (both positive and negative obstacles) can be used to define high priority areas for scanning. Historical information can also include information on topography and/or contours of the terrain to be travelled. Any features previously identified in the terrain can be targeted as high priority scan areas.

At 508, defined user preferences, if any exist (506 YES), can be retrieved. User preferences can define specific scan patterns for the negative object detector. For example, the defined scan pattern may specify a scan area, a scan range, and a path for the laser to traverse over the scan area. In some examples, user preference can also specify any one or more of the scan area, scan path, and scan range based on current vehicle telemetry (e.g., speed of the vehicle). In further examples, user preferences can specify smaller scan areas based on increases in vehicle speed, and in other examples, different scan patterns can be associated with different ranges of vehicle speed. The user preferences can also specify vehicle characteristics, including wheel or tire size, width of the vehicle, sizing for traversable obstacles (both positive and negative), etc. The wheel or tire size can be specified as a user preference and user preference can be used by a processing component (e.g., 108 of FIG. 1) to tailor a scan pattern to a specific vehicle. In other embodiments, user preferences can specify scan criteria based on terrain information. For example, known roads (e.g., paved) can be associated with scan patterns, scan locations, scan ranges, etc., that account for the road condition, and different preferences can be defined for off-road conditions. In another example, user preferences can include different scan characteristics based on weather conditions. In yet other examples, preferences associated with weather conditions can be used to modify existing scan characteristics.

If historic data exists (502 YES) or user preferences exist (504 YES), that information is retrieved at 504 or 508 respectively. According to one embodiment, the process flow 500 continues at 510, where planned travel path information or current vehicle telemetry (e.g., current speed, current course, current direction, current position, etc.) is received. In other executions, process flow 500 continues at 510, where no historical data in available 502 NO and/or where no user preferences are defined 506 NO. In some embodiments, a planned travel path or current vehicle telemetry can be provided or retrieved from navigation systems connected to a negative object detector. At 512, high priority scan areas can be identified based on at least the planned travel path information or current vehicle telemetry. In some embodiments, high priority scan areas are tailored specifically to current vehicle telemetry or the planned travel path. For example, areas in front of the vehicle's wheels can be scanned as high priority areas, while surrounding areas can scanned at a lower interval or even omitted. In further examples, scan range can be determined responsive to current speed, with the scan range increasing with increases in vehicle speed. At 514, control signals are communicated to a laser scanner device including, for example, a LCWG to steer a laser beam to the high priority scan areas. For example, the LCWG can direct the laser beam to areas where measurements indicate a potential negative obstacle. In other examples, steering the laser beam can include revisiting candidate obstacles and/or doing so with an increased refresh rate, as discussed in greater detail below.

According to some embodiments, dynamically tailoring scan patterns, scan locations, and/or scan frequency allows detailed interrogation of high priority areas. For example, execution of process flow 500 enables detailed interrogation of high priority areas and enables increases in refresh rate for high priority areas over conventional object detection approaches. In other embodiments, targeted scanning increases the response time for navigation changes, for example, based on higher refresh rates obtained on targeted scan areas. In further embodiments, tailoring the detection ranges (e.g., distance from vehicle) being scanned also increases the response time for navigation changes. As discussed, scan location can be adapted by a processing component (e.g., 108 of FIG. 1) to vehicle motion and terrain changes using inputs from an inertial navigation system (INS) or GPS. In other embodiments, the scan pattern is dynamically adapted to INS inputs, user preference, and/or known locations of obstacles.

According to one embodiment, tailoring of scan patterns, high priority areas, and/or refresh rates can occurs as execution of addition processes. For example, steps 512 and 514 may be executed in conjunction with and/or as process 1000 of FIG. 10, described in greater detail below. In further embodiments, the additional processes triggered can depend on the characteristics of the object detected (e.g., where the angle subtended by the object is less than the beam divergence of the object detector).

In some embodiments, a negative object detector can be used in conjunction with inertial navigation system for measurement and existing UGV navigation algorithms to create a map of traversable locations in space. The locations of obstacles identified on the map can then be used by navigation systems to plan routes to avoid negative or positive obstacles. An autonomous vehicle must avoid negative obstacles too large to pass over, unless the wheels can safely traverse the obstacle, and must also avoid positive obstacles too large to pass over.

Figure 6:
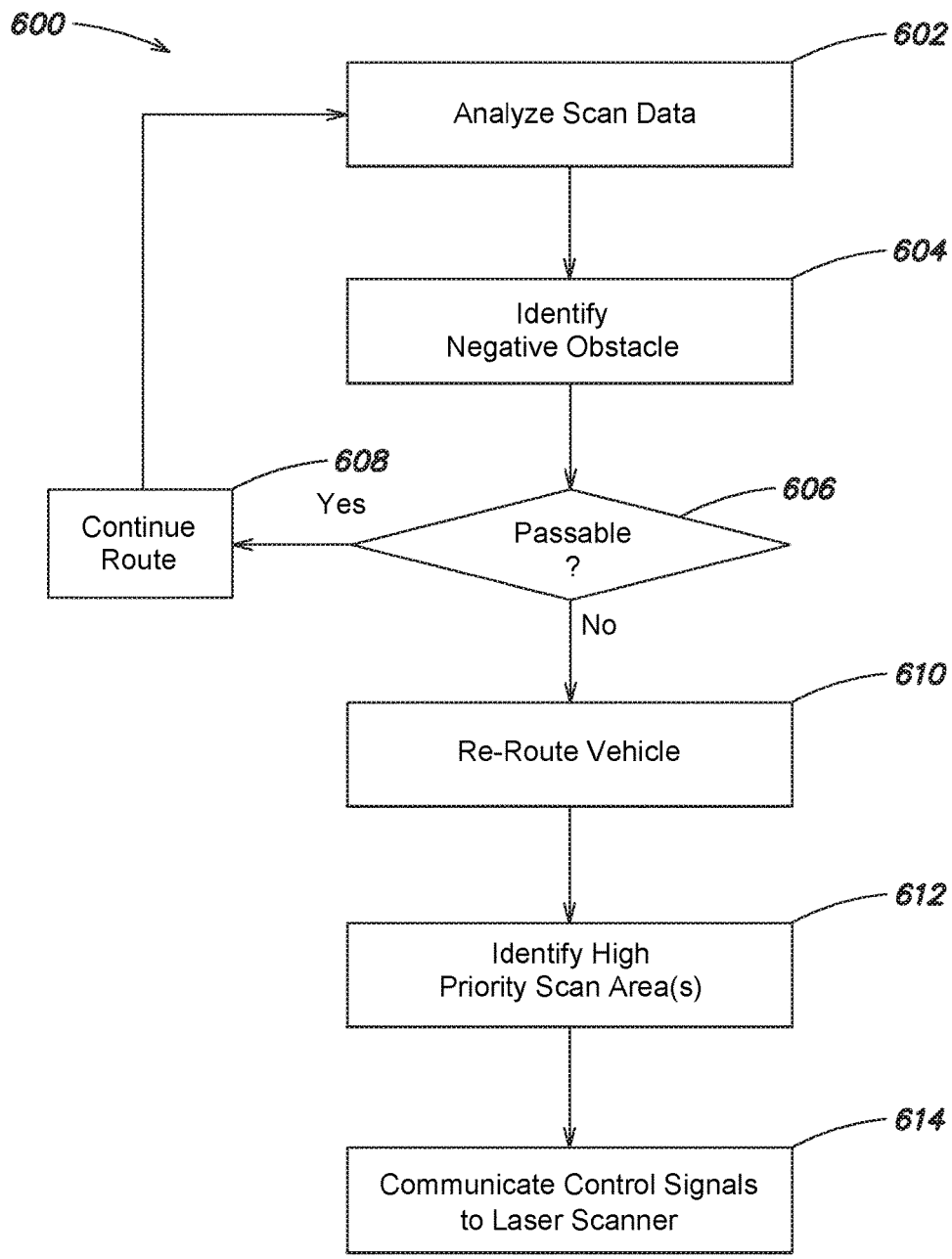
FIG. 6 is a process flow for adapting scan areas responsive to re-routing an autonomous vehicle according to aspects of the invention.

FIG. 6 is an example process flow 600 for adapting scan areas responsive to re-routing an autonomous vehicle. The process flow 600 beings at 602 with analysis of scan data, for example, obtained from a negative object detector. At 604, a negative obstacle is identified from the scan data. For example, discontinuity can be determined from range data obtained by the detector and the discontinuity can be associated with a negative obstacle. In some embodiments, multiple negative object detectors can be used to enable improved estimation of the size of the negative obstacle. According to one embodiment, identifying an obstacle (e.g., a negative obstacle at 604) can occur as part of another process (e.g., process 1000, FIG. 10). In other embodiments, multiple steps of process 600 can be executed in conjunction with or as execution of another process (e.g., 604-606 can be executed as at least part of process 1000, discussed in greater detail below).

Size of the obstacles can be used at 606 to determine if the obstacle is passable. If passable, 606 YES, the autonomous vehicle continues along a current path or planned route at 608, and process flow 600 continues with further analysis of scan data. If the object is determined not passable 606 NO, evasive maneuvers can be executed at 610. In some embodiments, step 610 is executed to re-route an autonomous vehicle towards traversable areas. To facilitate estimation of a size of an obstacle, multiple obstacle detectors may be used. If a size of an obstacle is too large, various known navigation algorithms can be executed as part of step 610, or called as sub-processes executed in conjunction with step 610.

At 612, new high priority scan areas are identified responsive to any new vehicle route or vehicle telemetry information received on the new route. Based on identifying the high priority areas, control signals are communicated to the LCWG of the negative object detector, for example, at 614. According to one embodiment, the process flow 600 is illustrative with respect to identification of negative obstacles, however, process flow 600 can also be executed to detect positive obstacles (e.g., at 604) with the remaining steps executed similarly in response to identifying positive obstacles.

Figure 7:
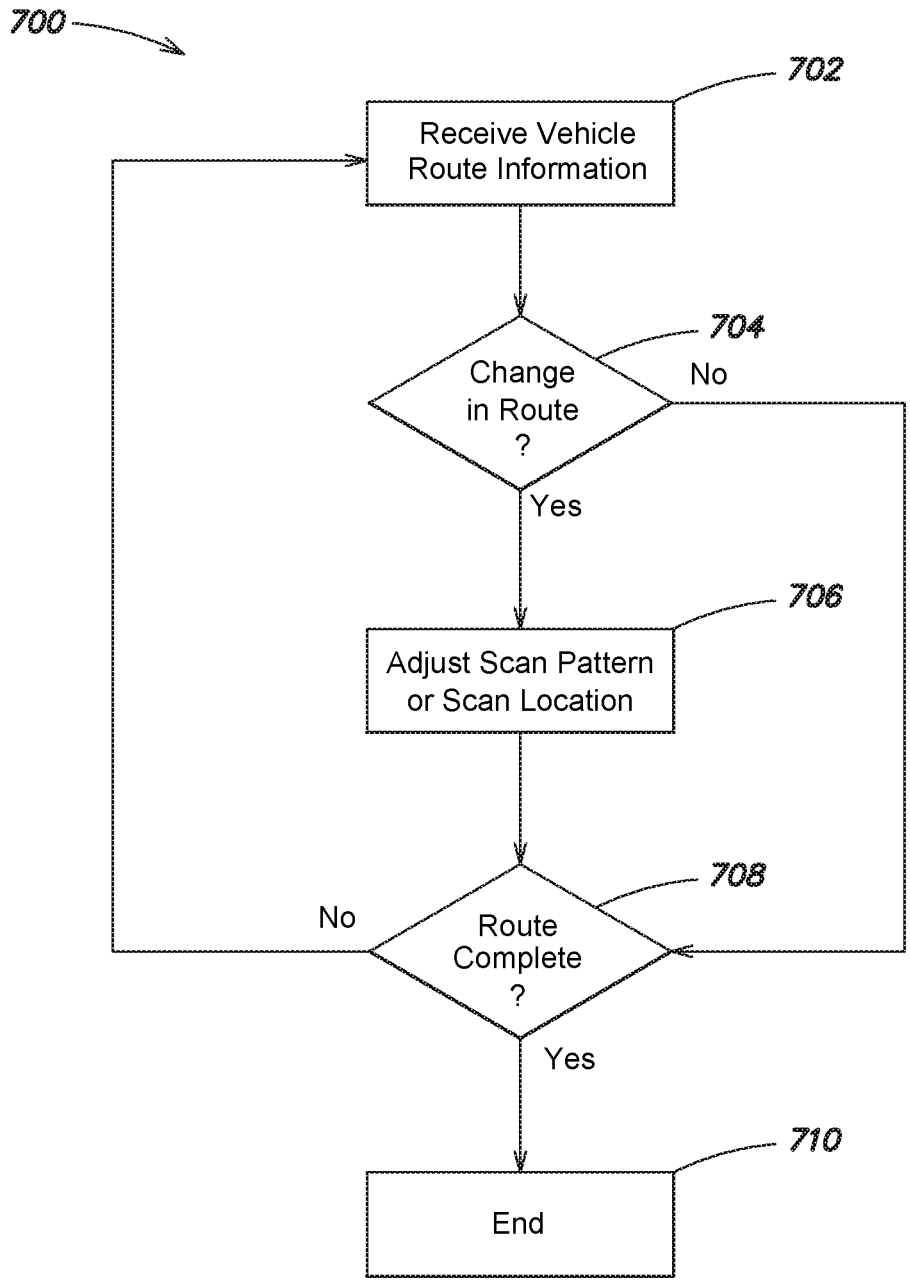
FIG. 7 is a process flow for continuous adjustments to scan patterns and/or scan locations according to aspects of the invention.

FIG. 7 is an example process flow 700 for continuous adjustments to scan patterns and/or scan locations. The process flow 700 begins at 702 with receiving vehicle route information. The vehicle route information can include vehicle telemetry received from navigations systems, including for example GPS and/or INS systems. If a change in route is identified at 704 YES, a current or base scan pattern, scan rate, and/or a current or base scan location can be adjusted at 706 in response to the change in route. Otherwise, process flow 700 continues at 704 NO until the route is complete at 708 YES. A change in route can be based, for example, on a change in a planned travel path. A change in route can also include any change in vehicle telemetry. For example, a change in vehicle speed or direction can trigger adjustments to scan pattern, scan rate, and/or scan location at 706. For example, adjustments to the scan pattern can include targeting a projected path for the wheels of a vehicle. In one embodiment, an LCWG can direct a laser beam to such areas. In another embodiment, the LCWG can adjust the scan pattern to target areas where measurements indicate a potential negative obstacle. In yet other examples, adjusting the scan pattern can include increasing a refresh rate for areas having potential negative obstacles, until the negative obstacle is unambiguously identified or determined traversable.

In some embodiments, scan patterns, scan locations, and/or scan rates can be associated with vehicle speed or speed ranges. Based on information received on the vehicles' current speed a processing component (e.g., 108 of FIG. 1) can select a predefined scan pattern, scan location, and/or scan rate. In further embodiments, the predefined scan pattern, scan location, and/or scan rate can be used by the processing component as minimal criteria that must be met when determining a scan pattern, scan rate, and/or scan location dynamically. In one embodiment, the processing component can be configured to further tailor any predefined criteria to the terrain being traversed, vehicle information, weather conditions, and/or other environmental conditions. In other embodiments, the processing component is configured to dynamically generate a scan pattern, a scan location, and/or a scan rate without any predefined criteria. The process flow 700 repeats the preceding steps via 708 NO, unless the route being traversed by the vehicle is complete at 708 YES, which ends process flow 700 at 710.

Figure 10:
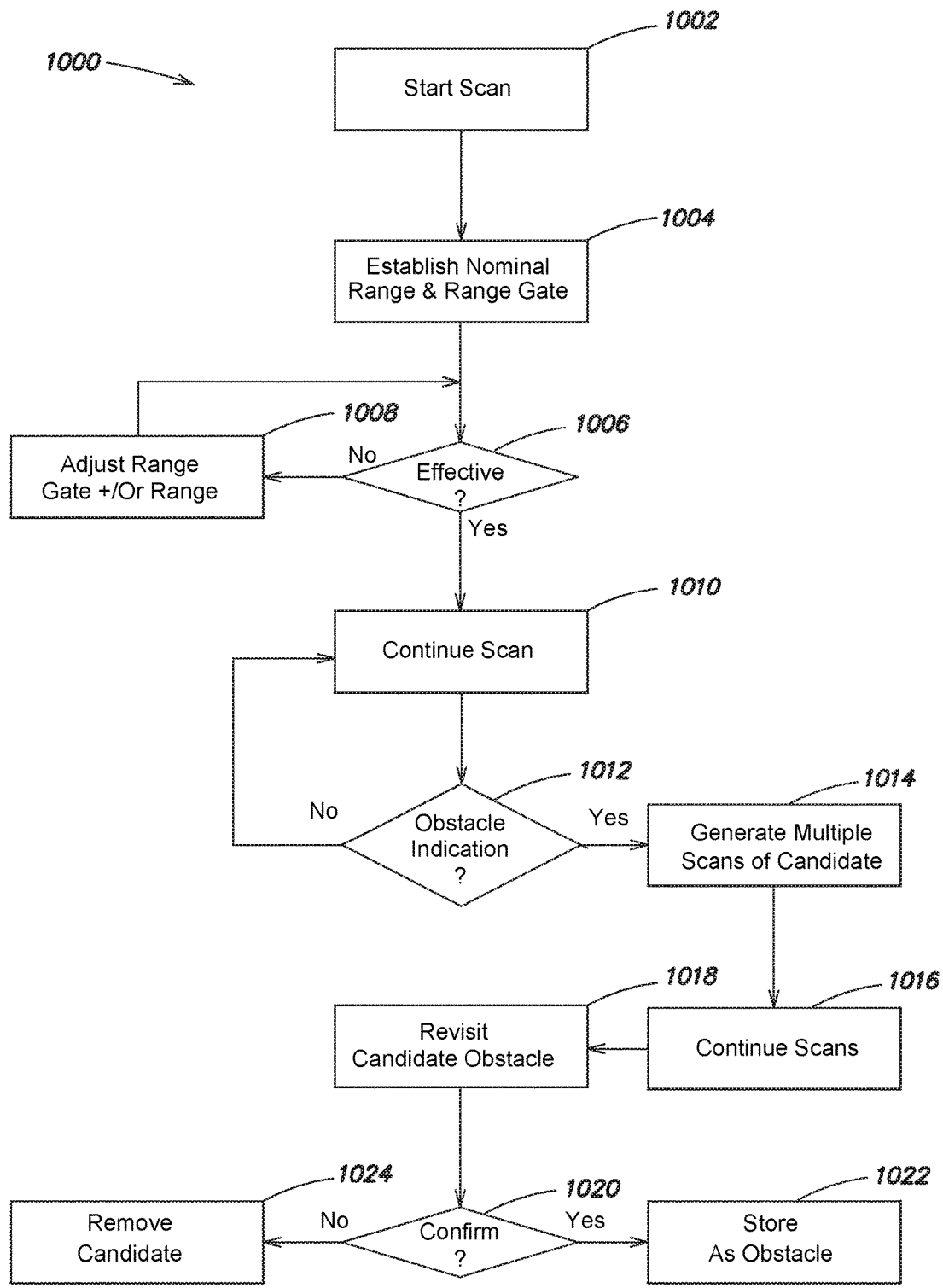
FIG. 10 is an example process flow for tailoring scan functions according to terrain and/or detected object characteristics.

As discussed, the processing for determining a scan area, scan rate, scan location, etc. can be influenced by the terrain and/or characteristics of a scanned object. FIG. 10 illustrates an example process flow 1000 for tailoring scan patterns according to terrain and/or detected object characteristics. In one embodiment, process 1000 can be triggered responsive to determining that for a potential object beam divergence is greater than an angle of the object (e.g., beam 902 of FIGS. 9A and 9B for object 906). In one embodiment, process 1000 begins at 1002 with starting scanning locations that are close to the vehicle (e.g., within 1-2 vehicle lengths) to determine a baseline range and trend for the travel plane being traversed by the vehicle at 1004. In further embodiments, step 1002 may be omitted where prior scans have established a trend for the travel plane and/or a baseline range for scanning Using the nominal range, a range gate can be set on either side of the beam to detect small perturbation in the travel plane. The range gate permits detection of a reflected beam from an emitter as specific interval to limit interference. Setting the range gate can occur as part of 1004 or can be set as a separate step (not shown). In some examples, setting the range gate at 1004 can include, dynamically changing the range gate of the range finder to account for slopes where the nominal range gate becomes ineffective to return meaningful range data (e.g., where terrain slopes away). In some embodiments, the system executing process 1000 must be configured to quickly change the range gate of the range finder at 1008 in response to the nominal scan range becoming ineffective 1006 NO. If the range and range gate are effective 1006 YES, scanning continues at 1010. For example, scanning can continue based on speed and terrain characteristics. Optionally, adjustments can be made to the range and/or range gate at 1010 responsive to terrain and/or vehicle telemetry changes.

If an obstacle indication is identified (e.g., detect discontinuity, detect edge, detect wall, etc.) at 1012 YES, multiple scans of the candidate obstacle are taken at 1014. Alternatively, at 1012 scanning continues according to a scan pattern until there is an obstacle indication at 1012 YES. The capture of multiple scans at 1014 can occur in conjunction with continued scanning at 1016. In one embodiment, the terrain in front of an autonomous vehicle is continuously scanned as multiple scans of the candidate obstacle are captured. In other embodiments, scanning may be alternated between the candidate obstacle and the terrain, and in further embodiments, multiple scanners can be used, and each tasked with scanning the candidate object or the terrain at the starting range as assigned by the system responsive to the obstacle indication at 1012 YES.

In some embodiments, generating the obstacle indication yields unambiguous information that an obstacle is present. For example, positive obstacles or negative obstacles where the beam divergence of the laser is less than the angle subtended by the negative obstacle can be identified unambiguously and process 1000 can terminate (not shown). Where the obstacle indication is ambiguous process 1000 continues to eliminate any ambiguity. For example, continued scanning in the region of the candidate obstacle at 1016 can yield more information as the autonomous vehicle approaches the obstacle. Continued scanning at 1016 can include scanning past the candidate obstacle (e.g., a hole) until range readings return to a normal state (e.g., the trend for the travel plane measures within an expected range or limited deviation from previous measurements).

Process 1000 continues with revisiting the candidate obstacle at 1018 with scanning in front and though the obstacle. In some embodiments, the change in angle of the beam as a vehicle approaches the obstacle yields more energy in the obstacle, and provides a stronger intensity of return, for example from a wall of the obstacle (e.g., similar to FIGS. 9A and 9B and obstacle 906). In some embodiments, the ratio of energy change can be evaluated to determine if the ratio of energy change matches the ratio of the hole subtense change. For example, with the time between measurements and vehicle speed a projected ratio can be determined and validated against the measurements. At 1020, an obstacle can be confirmed 1020 YES and any location information or other characteristics for the obstacle can be stored for subsequent use at 1022. Alternatively, if the obstacle is not confirmed 1022, information associated the candidate obstacle is deleted at 1024.

In some embodiments, multiple wavelength beams (e.g., 900 nm-1550 nm) can be used to detect obstacles. For example, a first wavelength of 900 nm and a second wavelength of 1550 nm can be selected to improve detection of energy distribution changes resulting from obstacles in a travel path. Thus checking a candidate obstacle at multiple wavelengths can occur as part of 1014-1020, as physical obstacle characteristics are independent of wavelength. In some embodiments, the property that the divergence of a laser is different at two wavelengths can be used to scan negative obstacles with multiple wavelengths. The returns can be reviewed to determine characteristics of the negative obstacle, for example, based on analyzing differences in the data returned from the two wavelengths. In another example, the different wavelengths can be evaluated to determine if the obstacle range is different at different locations as a result of the beams falling within the negative obstacle differently.

According to other embodiments, process 1000 or another process for identifying an obstacle can include a final verification step where the obstacle angular subtense is greater than or equal to the beam divergence. Multiple dimension scans can be used to identify the characteristics of any obstacle. For example, range readings taken in two dimensions yields information on the extent of a hole. Based on the determination of the characteristics of the obstacle, a decision can be made to go around or over the obstacle. According to various the steps illustrated may be executed in different order, and/or various ones of the steps illustrated may be omitted or combined. Process 1000 is described as an example and other embodiments can include fewer or more steps. Instructions for carrying out the various process tasks, process flows, calculations, and generation of signals and other data used in the operation of the negative object detector systems and methods can be implemented in software, firmware, or other computer readable instructions. These instructions are typically stored on any appropriate computer readable media used for storage of computer readable instructions or data structures. Such computer readable media can be any available media that can be accessed by a specially configured computer system or processor, or any specially configured programmable logic device. In some embodiments, process 1000 can be executed repeatedly and the information obtained on any obstacle can be used in subsequent executions. In other examples, the various processes discussed above can be used in conjunction and/or to generate data used in execution of other ones of the processes discussed. In further examples, the processes can be executed in conjunction, in sequence, and where one or more steps of the processes are interleaved during execution. The processes may be executed stepwise, and data obtained for each step made available to other steps and/or other processes and respective steps. In one, data captured during execution of any of the above processes can be saved and reused as part of later executions. The data may be saved on any suitable computer readable media.

According to one embodiment, suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures. Any of the foregoing may be supplemented by, implemented, or incorporated in, specially-designed application-specific integrated circuits (ASICs) or field programmable gate arrays (FPGAs). In some embodiments, specially designed hardware components can be fabricated to include controllers and/or software modules to execute the functions of the negative object detector described. For example, specialized hardware can be configured to perform any one of, or any combination of: operate a laser beam and determine range data; steer the laser beam according to a scan pattern; generate control signals for a waveguide; define a scan pattern, location, and or frequency (e.g., based on vehicle telemetry or a current travel path); and identify a negative obstacle from range data.

When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media. In other embodiments, computational operations may be distributed between multiple computer systems.

According to various embodiments, various optical sources may be used. For example, the optical source may include any suitable source of electromagnetic radiation. As used herein, electromagnetic radiation includes the flow of radiant energy formed by oscillating electric and magnetic disturbances, and for example, may include radio waves, microwaves, infrared radiation, visible light, ultraviolet radiation, X-rays, and gamma rays.

The methods of the invention can be implemented by computer executable instructions, such as program modules, which are executed by a processor. Generally, program modules include routines, programs, objects, data components, data structures, algorithms, and the like, which perform particular tasks or implement particular data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An obstacle detector comprising:
    a laser scanner device including:
        an optical source configured to emit a laser beam;
        a solid-state liquid crystal waveguide configured to steer the laser beam from the optical source over a field of regard of the laser scanner device according to a discrete scan pattern, a surface of a path of travel of an autonomous vehicle being within the field of regard of the laser scanner device; and
        a range detector that generates range information based on receiving a reflection of the laser beam and determines an intensity of the reflection of the laser beam; and
    at least one processor operatively connected to the solid-state liquid crystal waveguide and to the range detector and configured to:
        estimate a position of one or more portions of the autonomous vehicle that contact the surface of the path of travel;
        define the discrete scan pattern to cover at least the surface of the path of travel at the estimated position of the one or more portions of the autonomous vehicle that contact the surface of the path of travel;
        direct the solid-state liquid crystal waveguide to steer the laser beam over the field of regard according to the discrete scan pattern;
        identify an indicator of at least one hole in the surface of the path of travel based on a discontinuity in the intensity of the reflection of the laser beam and the range information, wherein the discontinuity is established by a plurality of reflections of the laser beam, over different angles of return, each of the plurality of reflections of the laser beam having the same range information and intensity of reflection;
        determine a location of an edge of the hole in the surface based on a departure from the same range information; and
        correlate a size of the hole in the surface of the path of travel relative to a sample time of the plurality of reflections of the laser beam having the same range information and intensity of reflection.

2. The obstacle detector of claim 1, wherein the at least one processor is configured to validate the indicator of the hole in the surface of the path of travel responsive to subsequent scanning of a region of the field of regard in which the indicator was identified.

3. The obstacle detector of claim 2, wherein the at least one processor is configured to evaluate the intensity of the reflection of the laser beam corresponding to a candidate obstacle to validate the indicator of the hole in the surface of the path of travel.

4. The obstacle detector of claim 1, wherein the optical source is configured to emit multiple wavelengths, and wherein the at least one processor is further configured to identify the indicator responsive to correlating reflections of the multiple wavelengths.

5. The obstacle detector of claim 1, wherein the at least one processor is further configured to select a range gate associated with the range detector from a plurality of range gates; wherein the at least one processor triggers:
    a first range gate for capturing general characteristics of the surface of the path of travel;
    a second range gate and a bit depth increase for detecting perturbations in the surface of the path of travel, the second range gate being smaller than the first range gate; and
    a third range gate to plot slopes of the surface of the path of travel or detect differences in heights of the surface of the path of travel, the third range gate being larger than the second range gate.

6. An autonomous vehicle comprising:
    at least a first wheel positioned to contact a surface of a path of travel of the autonomous vehicle;
    a navigation subsystem including at least one of an inertial navigation system (INS) and a GPS unit disposed on the autonomous vehicle;
    a laser scanner device disposed on the autonomous vehicle, the laser scanner device including:
        an optical source configured to emit a laser beam;
        a solid-state liquid crystal waveguide configured to steer the laser beam from the optical source over a field of regard of the laser scanner device according to a discrete scan pattern, the surface of the path of travel of the autonomous vehicle being within the field of regard of the laser scanner device; and
        a range detector that generates range information based on receiving a reflection of the laser beam and determines an intensity of the reflection of the laser beam; and
    at least one processor operatively connected to the solid-state liquid crystal waveguide and to the range detector and configured to:
        estimate a position of the at least first wheel;
        define the discrete scan pattern responsive to analyzing at least one of terrain information, vehicle information, information from the at least one of the INS and the GPS unit, and an estimate of the path of travel of the autonomous vehicle, the discrete scan pattern covering at least the surface of the path of travel at the estimated position of the at least first wheel;
        direct the solid-state liquid crystal waveguide to steer the laser beam over the field of regard according to the discrete scan pattern;
        identify an indicator of at least one hole in the surface of the path of travel based on a discontinuity in the intensity of the reflection of the laser beam and the range information, wherein the discontinuity is established by a plurality of reflections of the laser beam, over different angles of return, each of the plurality of reflections of the laser beam having the same range information and intensity of reflection;

determine a location of an edge of the hole in the surface based on a departure from the same range information; and correlate a size of the hole in the surface of the path of travel relative to a sample time of the plurality of reflections of the laser beam having the same range information and intensity of reflection.

7. The obstacle detector autonomous vehicle of claim 6, wherein the at least one processor is configured to generate control signals to manage steering of the solid-state liquid crystal waveguide according to the discrete scan pattern.

8. The autonomous vehicle of claim 7, wherein the at least one processor is further configured to define a scan frequency for high-speed rescanning of candidate obstacles.

9. The autonomous vehicle of claim 8, wherein at least one processor is configured to tailor the discrete scan pattern responsive to a vehicle speed of the autonomous vehicle.

10. The autonomous vehicle of claim 9, wherein the at least one processor is configured to reduce a scan area associated with the discrete scan pattern responsive to an increase in the vehicle speed or a decrease in the vehicle speed of the autonomous vehicle.

11. The autonomous vehicle of claim 6, wherein the at least one processor is configured to dynamically adjust a base scan pattern to emphasize priority areas in the field of regard of the laser scanner device, wherein the priority areas are identified by the at least one processor to correspond to the at least first wheel.

12. The autonomous vehicle of claim 6, wherein the at least first wheel includes a first single wheel, and wherein the at least one processor is configured to analyze the plurality of reflections of the laser beam to:

identify intensity differences to determine a location of the laser beam on the path of travel;

identify regions free of negative obstacles based on scan information for the estimated position of the at least first wheel; and identify positive obstacles larger than a ground clearance associated with the autonomous vehicle.

13. A method of detecting a hole in a surface of a path of travel of an autonomous vehicle, the method comprising:

emitting, by an optical source, a laser beam;

directing, by a solid-state liquid crystal waveguide, the laser beam over a scan area, including a surface of a path of travel of an autonomous vehicle and, within a field of regard, according to a discrete scan pattern;

estimating a position of one or more portions of the autonomous vehicle that contact the surface of the path of travel;

defining, by at least one processor, the discrete scan pattern to cover at least the surface of the path of travel at the estimated position of the one or more portions of the autonomous vehicle that contact the surface of the path of travel;

receiving, with a range detector, a plurality of reflections of the laser beam from the scan area over different angles of return;

processing, with the at least one processor, the plurality of reflections of the laser beam to determine range data and intensity information;

identifying, by the at least one processor, at least one hole in the surface of the path of travel based on a discontinuity in the range data and the intensity information, wherein the discontinuity is established by each of the plurality of reflections of the laser beam having the same range data and intensity of reflection;

determining a location of an edge of the hole in the surface based on a departure from the same range data; and correlating a size of the hole in the surface of the path of travel relative to a sample time of the plurality of reflections of the laser beam having the same range data and intensity of reflection.

14. The method of claim 13, wherein the act of identifying includes acts of:

analyzing multiple wavelengths in the plurality of reflections of the laser beam, and identifying the hole in the surface of the path of travel responsive to correlating returns from the multiple wavelengths.

15. The method of claim 13, further comprising rescanning a region of the scan area to validate identification of the at least one hole in the surface of the path of travel.

16. The method of claim 13, wherein the act of defining the discrete scan pattern includes defining the discrete scan pattern responsive to analyzing one or more of: terrain information, vehicle information, and an estimate of the path of travel path of the autonomous vehicle, and wherein the optical source, the solid-state liquid crystal waveguide, and the at least one processor are located on the autonomous vehicle.

17. The method of claim 13, wherein defining the discrete scan pattern includes:

defining a location and a scan frequency for high-speed rescanning of candidate obstacles; and tailoring the definition of the discrete scan pattern responsive to vehicle speed.

18. The method of claim 13, further comprising tailoring a range gate associated with the range detector:

establishing a first range gate for capturing general characteristics of the surface of the path of travel;

establishing a second range gate and a bit depth increase for detecting perturbations in the surface of the path of travel, the second range gate being smaller than the first range gate; and establishing a third range gate to plot slopes of the surface of the path of travel or detect differences in relative height of sections of the surface of the path of travel, the third range gate being larger than the second range gate.

19. The method of claim 13, further comprising analyzing return signals corresponding to the plurality of reflections of the laser beam and at least one of:

identifying intensity differences in the return signals to determine a location of the laser beam on the path of travel, responsive to analyzing the return signals;

identifying regions free of negative obstacles based on scan information for the estimated position of the one or more portions of the autonomous vehicle that contact the surface of the path of travel, wherein the surface of the path of travel at the estimated position of the one or more portions of the autonomous vehicle that contact the surface of the path of travel includes an area for a single wheel of the autonomous vehicle and another discrete area based on a distance offset associated with a second wheel of the autonomous vehicle, responsive to analyzing the return signals; or identifying positive obstacles larger than ground clearance associated with the autonomous vehicle, responsive to analyzing the return signals.

* * * * *